US012763359B2

(12) United States Patent
Yang et al.

(10) Patent No.: US 12,763,359 B2
(45) Date of Patent: Oct. 13, 2026

(54) ALL SOLID-STATE BATTERY

(71) Applicant: SAMSUNG SDI CO., LTD., Yongin-si (KR)

(72) Inventors: Jinhoon Yang, Yongin-si (KR); Byeonggyu Cho, Yongin-si (KR); Jinkyu Kim, Yongin-si (KR); Yunchae Jung, Yongin-si (KR); Sangil Han, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 587 days.

(21) Appl. No.: 18/013,307

(22) PCT Filed: Jun. 16, 2021

(86) PCT No.: PCT/KR2021/007563
§ 371 (c)(1),
(2) Date: May 11, 2023

(87) PCT Pub. No.: WO2022/092480
PCT Pub. Date: May 5, 2022

(65) Prior Publication Data

US 2023/0275262 A1 Aug. 31, 2023

(30) Foreign Application Priority Data

Oct. 26, 2020 (KR) ........................ 10-2020-0139422

(51) Int. Cl.
*H01M 10/0562* (2010.01)
*H01M 4/133* (2010.01)
(Continued)

(52) U.S. Cl.
CPC ....... *H01M 10/0562* (2013.01); *H01M 4/133* (2013.01); *H01M 4/366* (2013.01);
(Continued)

(58) Field of Classification Search
CPC .. H01M 10/0562; H01M 4/133; H01M 4/366; H01M 4/621; H01M 2004/027;
(Continued)

(56) References Cited

U.S. PATENT DOCUMENTS

2004/0106046 A1 6/2004 Inda
2009/0087730 A1 4/2009 Kondo et al.
(Continued)

FOREIGN PATENT DOCUMENTS

JP 2009-064644 A 3/2009
JP 2009-218125 * 9/2009 ............ H01M 10/36
(Continued)

OTHER PUBLICATIONS

JP 2009-218125 machine English translation (Year: 2009).*
(Continued)

*Primary Examiner* — Michael L Dignan
(74) *Attorney, Agent, or Firm* — Lee IP Law, P.C.

(57) ABSTRACT

The present invention relates an all solid-state battery, the all solid-state battery comprising: a current collecting body; a negative electrode comprising a negative electrode layer disposed on one surface of the current collecting body; a positive electrode; and a solid electrolyte layer located between the negative electrode and positive electrode, wherein the negative electrode layer thickness (a) and solid electrolyte layer thickness (b) have the relationship expressed in formula 1.

$$1.0 \leq b/a \leq 6.0 \quad \text{[formula 1].}$$

11 Claims, 3 Drawing Sheets

(51) Int. Cl.
*H01M 4/36* (2006.01)
*H01M 4/62* (2006.01)
*H01M 4/02* (2006.01)

(52) U.S. Cl.
CPC ...... *H01M 4/621* (2013.01); *H01M 2004/027* (2013.01); *H01M 2004/028* (2013.01)

(58) Field of Classification Search
CPC ..... H01M 2004/028; H01M 2004/021; H01M 2300/0068; H01M 4/1395; H01M 4/364; H01M 4/38; H01M 4/625; H01M 4/134; H01M 4/382; H01M 4/583; H01M 4/622; H01M 5/624; H01M 10/052; H01M 10/0585; H01M 4/587; Y02E 60/10; Y02P 70/50
See application file for complete search history.

(56) References Cited

U.S. PATENT DOCUMENTS

| | | | | |
|---|---|---|---|---|
| 2013/0040206 | A1 | 2/2013 | Yoshida et al. | |
| 2014/0212735 | A1 | 7/2014 | Li et al. | |
| 2016/0204466 | A1 | 7/2016 | Nogami et al. | |
| 2017/0331149 | A1* | 11/2017 | Sasaki | H01M 4/625 |
| 2018/0309167 | A1* | 10/2018 | Kaga | H01M 4/661 |
| 2019/0051925 | A1 | 2/2019 | Li et al. | |
| 2019/0157723 | A1* | 5/2019 | Suzuki | H01M 10/0562 |
| 2020/0136178 | A1 | 4/2020 | Ku et al. | |
| 2020/0185768 | A1 | 6/2020 | Kang et al. | |
| 2021/0036362 | A1* | 2/2021 | Ueno | H01M 10/0525 |
| 2021/0167417 | A1* | 6/2021 | Chao | H01M 4/62 |
| 2021/0202990 | A1 | 7/2021 | Lee et al. | |
| 2021/0367265 | A1 | 11/2021 | Sugiyo | |

FOREIGN PATENT DOCUMENTS

| | | | |
|---|---|---|---|
| JP | 2009-218125 | A | 9/2009 |
| JP | 4516588 | B2 | 8/2010 |
| JP | 2012-123968 | A | 6/2012 |
| JP | 2018-120709 | A | 8/2018 |
| JP | 2019-036391 | A | 8/2019 |
| KR | 10-2004-0047664 | A | 6/2004 |
| KR | 10-1037090 | B1 | 5/2011 |
| KR | 10-2015-0125936 | A | 11/2015 |
| KR | 10-2020-0050005 | A | 5/2020 |
| KR | 10-2020-0069215 | A | 6/2020 |
| KR | 10-2020-0069256 | A | 6/2020 |
| KR | 10-2020-0078479 | A | 7/2020 |

OTHER PUBLICATIONS

Korean Notice of Allowance dated Jun. 5, 2025, for Korean Patent Application No. 10-2023-0106178, a divisional application of the priority application KR 10-2020-0139422.
Extended European Search Report dated Sep. 23, 2024 of the corresponding European Patent Application No. 21886479.1.
International Search Report dated May 10, 2021 for PCT/2021/007563.
USPTO Office action mailed Apr. 28, 2026, in copending related U.S. Appl. No. 18/604,750.
Rejection dated Aug. 18, 2026, in co-pending, related application U.S. Appl. No. 18/604,750.

* cited by examiner

ALL SOLID-STATE BATTERY

CROSS REFERENCE TO RELATED APPLICATIONS

This is the U.S. national phase application based on PCT/KR2021/007563 filed on Jun. 16, 2021, which is based on Korean Patent Application No. KR 10-2020-0139422 filed on Oct. 26, 2020, the entire contents of all of which are hereby incorporated by reference.

TECHNICAL FIELD

It relates to an all solid-state battery

BACKGROUND ART

Recently, with the rapid spread of electronic devices such as mobile phones, laptop computers, and electric vehicles using batteries, the demand for small, lightweight, and relatively high-capacity rechargeable batteries is rapidly increasing. Particularly, a rechargeable lithium battery has recently drawn attention as a driving power source for portable devices, as it has lighter weight and high energy density. Accordingly, researches for improving performances of rechargeable lithium are actively studied.

Among rechargeable lithium batteries, an all solid-state battery refers to a battery in which all materials are solid, and particularly, a battery using a solid electrolyte. Such all-state battery has excellent safety as it has no leakage of an electrolyte and the thin film batteries are readily fabricated.

As a method of increasing the energy density of the all solid-state battery, there is a method of using a lithium metal as a negative electrode, but this causes expansion of volume of lithium and irreversibly generates dendrites during charging and discharging.

In order to solve such problems, there have been attempts to prepare a negative electrode from deposition of lithium on a negative current collector without using lithium metal itself, but it severely causes low power characteristics and short-circuits.

Technical Problem

One embodiment provides an all solid-state battery exhibiting excellent output characteristics and cycle-life characteristics.

Technical Solution

One embodiment provides an all solid-state battery including a negative electrode including a current collector and a negative electrode layer disposed on one surface of the current collector; a positive electrode; and a solid electrolyte located between the negative electrode and the positive electrode, wherein the negative electrode layer thickness (a) and the solid electrolyte layer thickness (b) have the relationship expressed in Equation 1.

$$1.0 \leq b/a \leq 6.0. \quad \text{[Equation 1]}$$

The negative electrode layer thickness (a) and the solid electrolyte layer thickness (b) may have the relationship expressed in Equation 1a, and according to another embodiment, may have a relationship expressed in Equation 2.

$$1.0 \leq b/a \leq 6.0 \quad \text{[Equation 1a]}$$

$$2.0 \leq b/a \leq 5.0 \quad \text{[Equation 2]}$$

The negative electrode may have a thickness of 5 μm to 15 μm.

The solid electrolyte layer may have a thickness of 5 μm to 90 μm.

The negative electrode layer may include a negative active material and a binder. The negative active material may include a carbon-based material and metal particles.

Herein, an amount of the binder may be 1 wt % to 40 wt % based on the total, 100 wt % of the negative active material.

The binder may include a butadiene-based rubber and a cellulose-based compound.

The negative active material may be amorphous carbon.

The metal particle may be selected from Ag, Zn, Al, Sn, Mg, Ge, Cu, In, Ni, Bi, Au, Si, Pt, Pd or a combination thereof. The metal particle may have a size of 5 nm to 800 nm.

The solid electrolyte included in the solid electrolyte layer may be a sulfide-based solid electrolyte. The solid electrolyte may be $Li_aM_bP_cS_dA_e$ (where a, b, c, d and e are all 0 or more and 12 or less, M is Ge, Sn, Si, or a combination thereof, and A is one of F, Cl, Br, or I).

The negative electrode may further include a lithium deposition layer, after charging. The lithium deposition layer may have a thickness of 10 μm to 50 μm.

Advantageous Effects

The all solid-state battery according to one embodiment may exhibit excellent output characteristics and cycle-life characteristics.

MODE FOR INVENTION

Figure 1:
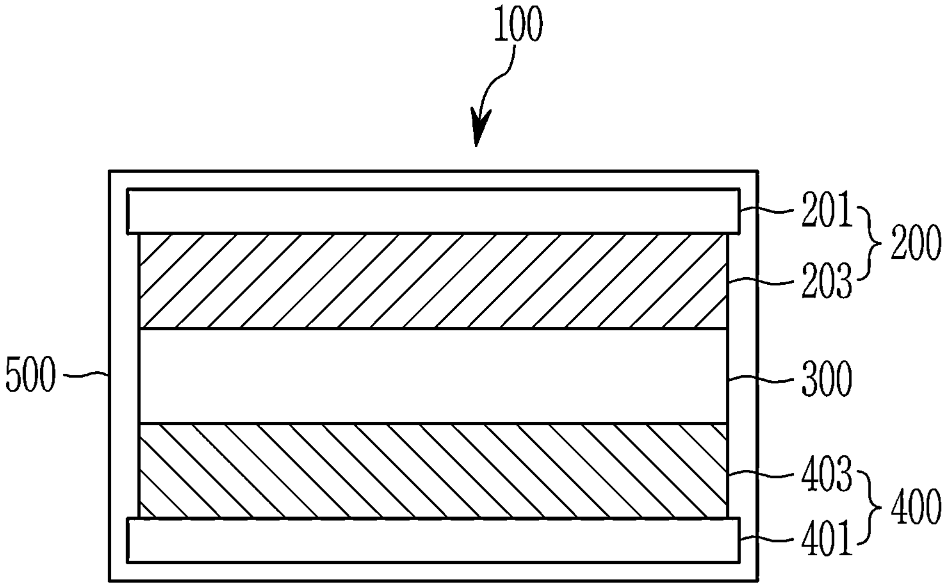
FIG. 1 is a schematic cross-sectional view of the all solid-state battery according to one embodiment.

Hereinafter, embodiments of the present invention are described in detail. However, these embodiments are merely examples, the present invention is not limited thereto, and the present invention is defined by the scope of the claims.

Unless otherwise defined in the specification, it will be understood that when an element, such as a layer, a film, a region, a plate, and the like is referred to as being "on" or "over" another element, it may be directly on, connected to, or coupled to the other element or layer, or one or more intervening elements may be present. In addition, it will also be understood that when an element is referred to as being "between" two elements, it may be the only element between the two elements, or one or more intervening elements may also be present.

In the present invention, "particle size" or "a particle diameter", may be an average particle diameter. Unless otherwise defined in the specification, the average particle diameter may be defined as an average particle diameter D50 indicating the diameter of particles having a cumulative volume of 50 volume % in the particle size distribution, and may be measured by a PSA (particle size analyzer). The average particle size (D50) may be measured by, for example, electron microscope observation such as by using a scanning electron microscopic (SEM), field emission scanning electron microscopy (FE-SEM), or a laser diffraction method. The laser diffraction may be obtained by distributing particles to be measured in a distribution solvent and introducing it to a commercially available laser diffraction particle measuring device (e.g., MT 3000 available from Microtrac, Ltd.), irradiating ultrasonic waves of about 28 kHz at a power of 60 W, and calculating an average particle diameter (D50) in the 50% standard of particle distribution in the measuring device.

An all solid-state battery according to one embodiment includes a negative electrode including a current collector and a negative electrode layer disposed on one surface of the current collector; a positive electrode; and a solid electrolyte located between the negative electrode and the positive electrode.

Herein, the negative electrode layer thickness (a) and the solid electrolyte layer thickness (b) may have the relationship expressed in Equation 1, and according to one embodiment, may have the relationship expressed in Equation 1a. In addition, according to another embodiment, the negative electrode layer thickness (a) and the solid electrolyte layer thickness (b) may have the relationship expressed in Equation 2.

$$1.0 \leq b/a \leq 6.0. \quad \text{[Equation 1]}$$

$$1.0 \leq b/a \leq 6.0 \quad \text{[Equation 1a]}$$

$$2.0 \leq b/a \leq 5.0 \quad \text{[Equation 2]}$$

When the negative electrode layer thickness (a) and the solid electrolyte layer thickness (b) satisfy the relationship, the lithium dendrite growth may be effectively suppressed during the charging, thereby improving cycle-life characteristics and output characteristics.

If the negative electrode layer thickness (a) and the solid electrolyte layer thickness (b) are out of the relationship expressed in Equation 1, for example, b/a of less than 1, does not suppress the lithium dendrites growth, and b/a of more than 6 increases resistance.

In one embodiment, the negative electrode thickness may refer to a distance from the surface contact with the solid electrolyte layer to the current collector, and according to one embodiment, may be the longest distance from the surface contact with the solid electrolyte layer to the current collector.

In one embodiment, while the negative electrode layer thickness and the solid electrolyte layer satisfy the relationship expressed in Equation 1 relationship, the thickness of the negative electrode layer may have 5 μm to 15 μm and the solid electrolyte layer may have a thickness of 5 μm to 90 μm.

When the thicknesses of the negative electrode layer and the solid electrolyte layer are within the above ranges while satisfying the relations ship of Equation 1, lithium dendrites growth which may occurred during charging, may be effectively suppressed, there is almost no irreversible capacity, and thus, capacity may be more improved and resistance may be more reduced.

Even If the thicknesses of the negative electrode layer and the solid electrolyte layer are each within the above range, if it does not satisfy the relationship of Equation 1, the capacity retention is deteriorated and the output characteristic is decreased.

The negative electrode layer may include a negative active material and a binder.

The negative active material may include a carbon-based material and metal particles. The carbon-based material may be amorphous carbon, and for example, carbon black, acetylene black, denka black, ketjen black, furnace black, activated carbon, or a combination thereof. An example of the carbon black may be Super P (available from Timcal, Ltd.

The amorphous carbon may single particles, a secondary particle in which primary particles are agglomerated, or a combination thereof.

The single particles may have a particle diameter of 10 nm to 60 nm. In addition, a particle diameter of the primary particles may be 20 nm to 100 nm, and a particle diameter of the secondary particle may be 1 μm to 20 μm.

In one embodiment, a particle diameter of the primary particles may be 20 nm or more, 30 nm or more, 40 nm or more, 50 nm or more, 60 nm or more, 70 nm or more, 80 nm or more, or 90 nm or more, and 100 nm or less, 90 nm or less, 80 nm or less, 70 nm or less, 60 nm or less, 50 nm or less, 40 nm or less, or 30 nm or less.

In one embodiment, a particle diameter of the secondary particle may be 1 μm or more, 3 μm or more, 5 μm or more, 7 μm or more, 10 μm or more, or 15 μm or more, and 20 μm or less, 15 μm or less, 10 μm or less, 7 μm or less, 5 μm or less, or 3 μm or less.

The shape of the primary particle may be spherical, oval, plate-shaped, or a combination thereof, and in one embodiment, the shape of the primary particle may be spherical, oval, or a combination thereof.

The metal nanoparticle may be Ag, Au, Sn, Zn, Al, Mg, Ge, Cu, In, Ni, Bi, Pt, Pd, or a combination thereof. The inclusion of the metal nanoparticles in the negative layer may further improve the electrical conductivity of the negative electrode.

The metal particle may have a size of 5 nm to 800 nm. The size of the metal particle may be 5 nm or more, 50 nm or more, 100 nm or more, 150 nm or more, 200 nm or more, 250 nm or more, 300 nm or more, 350 nm or more, 400 nm or more, 450 nm or more, 500 nm or more, 550 nm or more, 600 nm or more, 650 nm or more, 700 nm or more, or 750 nm or more. Furthermore, the size of the metal particle may be 800 nm or less, 750 nm or less, 700 nm or less, 650 nm or less, 600 nm or less, 550 nm or less, 500 nm or less, 450 nm or less, 400 nm or less, 350 nm or less, 300 nm or less, 250 nm or less, 200 nm or less, 150 nm or less, 100 nm or less, or 50 nm or less. When the size of the metal particle is within the above range, the battery characteristics, for example, cycle-life characteristics of the all solid-state battery, may be improved.

When the negative electrode layer includes the carbon-based material and the metal particles, a mixing ratio of the carbon-based material and the metal particles may be 1:1 to 99:1 by weight ratio. For example, an amount of the carbon-based material may be, based on the metal particle, 1 or more, 2 or more, 3 or more, 4 or more, 5 or more, 10 or more, 15 or more, 20 or more, 25 or more, 30 or more, 35 or more, 40 or more, 45 or more, 50 or more, 55 or more, 60 or more, 65 or more, 70 or more, 75 or more, 80 or more, 85 or more, 90 or more or 95 or more, and 99 or less, 95 or less, 90 or less, 85 or less, 80 or less, 75 or less, 70 or less, 65 or less, 60 or less, 55 or less, 50 or less, 45 or less, 40 or less, 35 or less, 30 or less, 25 or less, 20 or less, 15 or less, 10 or less, 5 or less, 4 or less, 3 or less or 2 or less. For example, the weight ratio of the carbon-based material and the metal particles may be 1:1 to 5:1, 1:1 to 10:1, 1:1 to 20:1, 1:1 to 30:1, 1:1 to 40:1, 1:1 to 50:1, 1:1 to 60:1, 1:1 to 70:1, 1:1 to 80:1, or 1:1 to 90:1. When weight ratio of the carbon-based material and the metal particles is within the range, the electrical conductivity of the negative electrode may be more improved.

The binder may be an aqueous binder and may improve ionic conductivity and electrical conductivity, rather than using a non-aqueous binder such as a polyvinylidene fluoride.

The aqueous binder may include a butadiene-based rubber and a cellulose-based compound. When the binder includes the butadiene-based rubber and the cellulose-based compound, the dispersibility of the carbon-based material and the metal particle may be improved, excellent adherence may be exhibited, and the structural stability may be improved.

The butadiene rubber may include a substituted alkylene structural unit and a structural unit derived from butadiene, and specifically, styrene butadiene rubber (SBR), nitrile butadiene rubber (NBR), acrylate butadiene rubber (ABR), methacrylate butadiene rubber, acrylonitrile-butadiene-styrene rubber (ABS), styrene-butadiene-styrene rubber (SBS), and a combination thereof.

The substituted alkylene structural unit may be derived from a substituted or unsubstituted styrene-based monomer, and an example of the substituted or unsubstituted styrene-based monomer may be styrene, α-methylstyrene, 3-methylstyrene, 4-methyl styrene, 2,4-dimethyl styrene, 2,5-dimethylstyrene, 2-methyl-4-chlorostyrene, 2,4,6-trimethylstyrene, cis-β-methyl styrene, trans-β-methyl styrene, 4-methyl-α-methylstyrene, 4-fluoro-α-methylstyrene, 4-chloro-α-methylstyrene, 4-bromo-α-methylstyrene, 4-t-butyl styrene, 2-fluorostyrene, 3-fluorostyrene, 4-fluorostyrene, 2,4-difluorostyrene, 2,3,4,5,6-pentafluorostyrene, 2-chlorostyrene, 3-chlorostyrene, 4-chlorostyrene, 2,4-dichlorostyrene, 2,6-dichlorostyrene, octachlorostyrene, 2-bromostyrene, 3-bromostyrene, 4-bromostyrene, 2,4-dibromostyrene, α-bromostyrene, β-bromostyrene, or a combination thereof.

In another embodiment, the substituted alkylene structural unit may be derived from a substituted or unsubstituted nitrile-based monomer, and an example of the substituted or unsubstituted nitrile-based monomer may be acrylonitrile, methacrylonitrile, fumaronitrile, α-chloronitrile, α-cyanoethyl acrylonitrile, or a combination thereof.

The structural unit derived from butadiene may be a structural unit derived from a butadiene monomer, and an example of the butadiene monomer may be 1,3-butadiene, isoprene, 2,3-dimethyl-1,3-butadiene, 2-ethyl-1,3-butadiene, or a combination thereof.

The cellulose-based compound may be carboxyl alkyl cellulose, salts thereof, or a combination thereof. The alkyl of the carboxyl alkyl cellulose may be a lower alkyl, such as a C1 to C6 alkyl, a linear alkyl or a branched alkyl. The salts of the cellulose-based compound may be alkali salts, such as Na, Li, or a combination thereof.

The cellulose-based compound imparts high viscosity and good applicability and simultaneous improvement of adhesion, thereby preventing separation of the negative electrode layer from the current collector and providing excellent cycle-life characteristics. The alky of the carboxyl alkyl cellulose is a lower alkyl, and thus such a carboxyl alkyl cellulose has high water-solubility to suitably fabricate a water-based electrode.

The butadiene-based rubber and the cellulose-based compound may be included in the negative electrode at a 1:1 to 6:1 weight ratio. A weight of the butadiene-based rubber may be, based on the cellulose-based compound, 1.1 or more, 1.2 or more, 1.3 or more, 1.4 or more, 1.5 or more, 1.6 or more, 1.7 or more, 1.8 or more, 1.9 or more, 2.0 or more, 2.1 or more, 2.2 or more, 2.3 or more, 2.4 or more, 2.5 or more, 2.6 or more, 2.7 or more, 2.8 or more, 2.9 or more, or 3.0 or more and 5 or less, 4.9 or less, 4.8 or less, 4.7 or less, 4.6 or less, 4.5 or less, 4.4 or less, 4.3 or less, 4.2 or less, 4.1 or less, 4.0 or less, 3.9 or less, 3.8 or less, 3.7 or less, 3.6 or less, 3.5 or less, 3.4 or less, 3.3 or less, 3.2 or less, 3.1 or less, or 3.0 or less. In one embodiment, the weight ratio of the butadiene-based rubber and the cellulose-based compound may be 1:1 to 5:1 or 1:1 to 6:1.

When the butadiene-based rubber and the cellulose-based compound are included at the weight ratio, the binder may impart suitable flexibility to the negative electrode layer, thereby inhibiting cracking of the negative electrode layer and increasing the adhesion of the surface of the negative electrode layer. On the other hand, if the butadiene-based rubber and the cellulose-based compound are included out of the range, the rigidity of the negative electrode may be deteriorated.

An amount of the binder may be 1 wt % to 40 wt % based on the total, 100 wt %, of the negative active material. The amount of the binder may be, based on the total, 100 wt %, of the negative active material, 1 wt % to 30 wt %, 1 wt % to 15 wt %, and for example, the amount of the binder may be, based on the total, 100 wt % of the negative active material, 1 wt % or more, 2 wt % or more, 3 wt % or more, 4 wt % or more, 5 wt % or more, 6 wt % or more, 7 wt % or more, 8 wt % or more, 9 wt % or more, 10 wt % or more, 11 wt % or more, 12 wt % or more, 13 wt % or more, or 14 wt % or more, and 15 wt % or less, 14 wt % or less, 13 wt % or less, 12 wt % or less, 11 wt % or less, 10 wt % or less, 9 wt % or less, 8 wt % or less, 7 wt % or less, 6 wt % or less, 5 wt % or less, 4 wt % or less, 3 wt % or less, or 2 wt % or less.

When the binder is included in the negative electrode of the all solid-state battery at the weight range, the electrical resistance and the adhesion may be improved, and thus the characteristics (battery capacity and power characteristics) of the all solid-state battery may be improved.

The negative electrode may further include the negative active material and the binder, as well as, for example, additives such as a conductive material, a filler, a dispersing agent, and an ionic conductive material. As the filler, the dispersing agent, the ionic conductive material included in the negative electrode layer, and a well-known material generally used for the all solid-state battery may be used.

The current collector may be, for example, indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof, and may have a foil shape or a sheet shape.

A solid electrolyte included in the solid electrolyte layer may be sulfide-based solid electrolyte, and for example, an argyrodite-type sulfide-based solid electrolyte. The sulfide-based solid electrolyte may be suitable, as it may exhibit better electrochemical characteristics within wider operation temperature ranges and good ionic conductivity compared to other solid electrolytes such as an oxide-based solid electrolyte, etc.

In one embodiment, the solid electrolyte may be $Li_aM_bP_cS_dA_e$ (where a, b, c, d, and e are each an integer of 0 or more, and 12 or less, M is Ge, Sn, Si, or a combination thereof, and A is one of F, Cl, Br, and I), and more specifically, $Li_3PS_4$, $Li_7P_3S_{11}$, or $Li_6PS_5Cl$.

Such a sulfide-based solid electrolyte may be prepared, for example, by a fusion quenching process or mechanical milling using starting materials such as $Li_2S$, $P_2S_5$, or the like. After the treating, a heat treatment may be performed. The solid electrolyte may be amorphous, crystalline, or a combination thereof.

The sulfide-based solid electrolyte may be a commercial solid electrolyte.

The solid electrolyte layer may further include a binder. The binder may be styrene butadiene rubber, nitrile butadiene rubber, polytetrafluoroethylene, polyvinylidene fluoride, polyethylene, an acrylate-based polymer, or a combination thereof, and may be any material which is generally used in the related art. The acrylate-based polymer may be butyl acrylate, polyacrylate, polymethacrylate, or a combination thereof.

The solid electrolyte layer may be prepared by adding a solid electrolyte to a binder solution, coating it on a substrate film, and drying it. The binder solution may include isobutylyl isobutylate, xylene, octyl acetate, or a combination thereof, as a solvent. The solid electrolyte layer preparation is widely known in the art, so a detailed description thereof will be omitted in the specification.

When the all solid battery according to one embodiment is charged, lithium ions are released from a positive active material and pass through the solid electrolyte to move to the negative electrode, and thus, it is deposited to the negative current collector to form a lithium deposition layer. That is, the lithium deposition layer may be formed between the negative current collector and the negative active material layer.

The charging may be a formation process which may be performed at 0.05 C to 1 C at about 25° C. to about 50° C. once to three times.

The lithium deposition layer may have a thickness of 10 μm to 50 μm. For example, the thickness of the lithium deposition layer may be 10 μm or more, 20 μm or more, 30 μm or more, or 40 μm or more, and 50 μm or less, 40 μm less, 30 μm less, or 20 μm less. When the thickness of the lithium deposition layer is satisfied in the range, the lithium is reversibly deposited during charge and discharge, thereby further improving the cycle-life characteristics.

The positive electrode may include a positive current collector and a positive active material layer positioned on one side of the positive current collector.

The positive active material layer may further include a positive active material. The positive active material may include compounds that reversibly intercalate and deintercalate lithium ions (lithiated intercalation compounds). For example, it may include one or more composite oxides of a metal selected from cobalt, manganese, nickel, and a combination thereof, and lithium. The examples of the positive active material may be $Li_aA_{1-b}B^1_bD^1_2$ ($0.90 \le a \le 1.8$, $0 \le b \le 0.5$); $Li_aE_{1-b}B^1_bO_{2-c}D^1_c$ ($0.90 \le a \le 1.8$, $0 \le b \le 0.5$, $0 \le c \le 0.5$); $Li_aE_{2-b}B^1_bO_{4-c}D^1_c$ ($0.90 \le a \le 1.8$, $0 \le b \le 0.5$, $0 \le c \le 05$); $Li_aNi_{1-b-c}Co_bB^1_cD^1_\alpha$ ($0.90 \le a \le 1.8$, $0 \le b \le 0.5$, $0 \le c \le 0.5$, $0 < \alpha \le 2$); $Li_aNi_{1-b-c}Co_bB^1_cO_{2-\alpha}F^1_\alpha$ ($0.90 \le a \le 1.8$, $0 \le b \le 0.5$, $0 \le c \le 0.5$, $0 < \alpha < 2$); $Li_aNi_{1-b-c}Co_bB^1_cO_{2-\alpha}F^1_2$ ($0.90 \le a \le 1.8$, $0 \le b \le 0.5$, $0 \le c \le 0.5$, $0 < \alpha < 2$); $Li_aNi_{1-b-c}Mn_bB^1_cD^1_\alpha$ ($0.90 \le a \le 1.8$, $0 \le b \le 0.5$, $0 \le c \le 0.5$, $0 < \alpha \le 2$); $Li_aNi_{1-b-c}Mn_bB^1_cO_{2-\alpha}F^1_\alpha$ ($0.90 \le a \le 1.8$, $0 \le b \le 0.5$, $0 \le c \le 0.5$, $0 < \alpha < 2$); $Li_aNi_{1-b-c}Mn_bB^1_cO_{2-\alpha}F^1_2$ ($0.90 \le a \le 1.8$, $0 \le b \le 0.5$, $0 \le c \le 0.5$, $0 < \alpha < 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$); $Li_aCoG_bO_2$ ($0.90 \le a \le 1.8$, $0.001 \le b \le 0.1$); $Li_aMnG_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $QO_2$; $QS_2$; $LiQS_2$; $V_2O_5$; $LiV_2O_5$; $LiI^1O_2$; $LiNiVO_4$; $Li_{(3-f)}J_2PO_{43}$ ($0 \le f \le 2$); $Li_{(3-f)}Fe_2PO_{43}$ ($0 \le f \le 2$); or $LiFePO_4$.

In the chemical formulae, A is selected from Ni, Co, Mn, or a combination thereof; $B^1$ is selected from Al, Ni, Co, Mn, Cr, Fe, Mg, Sr, V, a rare earth element, or a combination thereof; $D^1$ is selected from O, F, S, P, or a combination thereof; E is selected from Co, Mn, or a combination thereof; $F^1$ is selected from F, S, P, or a combination thereof; G is selected from Al, Cr, Mn, Fe, Mg, La, Ce, Sr, V, or a combination thereof; Q is selected from Ti, Mo, Mn, or a combination thereof; $I^1$ is selected from Cr, V, Fe, Sc, Y, or a combination thereof; and J is selected from V, Cr, Mn, Co, Ni, Cu, or a combination thereof.

According to one embodiment, the positive active material may be a three-component-based lithium transition metal oxide such as $LiNi_xCo_yAl_zO_2$ (NCA), $LiNi_xCo_yMn_zO_2$ (NCM) (herein, $0<x<1$, $0<y<1$, $0<z<1$, $x+y+z=1$), etc.

The compounds may have a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof The coating layer may be disposed in a method having no adverse influence on properties of a positive active material by using these elements in the compound. For example, the method may include any coating method such as spray coating, dipping, and the like, but is not illustrated in more detail since it is well-known in the related field.

Furthermore, the coating layer may be any coating materials which are known as a coating layer for the positive active material of the all solid battery, and for example, may be $Li_2O—ZrO_2$ (LZO), etc.

When the positive active material includes a three-component-based active material such as NCA or NCM, and includes nickel, the capacity density of the all solid battery may be further improved, and the elution of metal from the positive active material may be further reduced during the charging. Thus, the all solid battery exhibits more improved reliability and cycle-life characteristics in the charge state.

Herein, the shape of the positive active material may be, for example, particle shapes such as a spherical shape and an oval spherical shape. The average particle diameter of the positive active material may not be specifically limited, and may be in any range which may be applied to a positive active material of the conventional all solid-state secondary battery. The amount of the positive active material included in the positive active material may not be specifically limited, and may be in any range which may be applied to a positive active material of the conventional all solid-state secondary battery.

The positive active material layer may further include a solid electrolyte. The solid electrolyte included in the positive active material layer may be the aforementioned solid electrolyte, and may be the same as or different from the solid electrolyte included in the solid electrolyte layer. The solid electrolyte may be included in an amount of 10 wt % to 30 wt % based on the total weight of the positive active material layer.

The positive current collector 131 may be indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof, and may have a foil shape or a sheet shape.

The positive active material layer may further include additives such as a conductive material, a binder, a filler, a dispersing agent, an ion conductive material, etc., in addition to the aforementioned positive active material and the solid electrolyte.

The filler, the dispersing agent, and the ion conductive material which are included in the positive active material layer may be the same as the additive included in the negative active material layer. Herein the conductive material may be 1 wt % to 10 wt % with reference to the total of 100 wt % of the positive active material layer.

The binder which may be included in the positive active material may be, for example, a styrene butadiene rubber (SBR), polytetrafluoroethylene, polyvinylidene fluoride, polyethylene, etc.

The thickness of the positive active material layer may be 90 μm to 200 μm. For example, the thickness of the positive active material layer may be 90 μm or more, 100 μm or more, 110 μm or more, 120 μm or more, 130 μm or more, 140 μm or more, 150 μm or more, 160 μm or more, 170 μm or more, 180 μm or more, or 190 μm or more, and 200 μm or less, 190 μm or less, 180 μm or less, 170 μm or less, 160 μm or less, 150 μm or less, 140 μm or less, 130 μm or less, 120 μm or less, or 110 μm or less. As described above, the thickness of the positive active material layer is greater than the thickness of the negative active material layer, and thus the capacity of the positive electrode is larger than the capacity of the negative electrode.

The positive electrode may be prepared by forming a positive active material layer on a positive current collector using a dry-coating or wet-coating process.

In one embodiment, the all solid-state battery may further include a buffer material for buffering a thickness variation caused from charge and discharge. The buffer material may be positioned between the negative electrode and the positive electrode, or positioned between the one assembly and another assembly of the battery in which at least one electrode assembly is stacked.

The buffer material may be materials having elasticity recovery of 50% or more and insulating properties, and specifically, may be silicon rubber, acryl rubber, fluorine-based rubber, nylon, synthetic rubber, or a combination thereof. The buffer material may be a polymer sheet.

Figure 2:
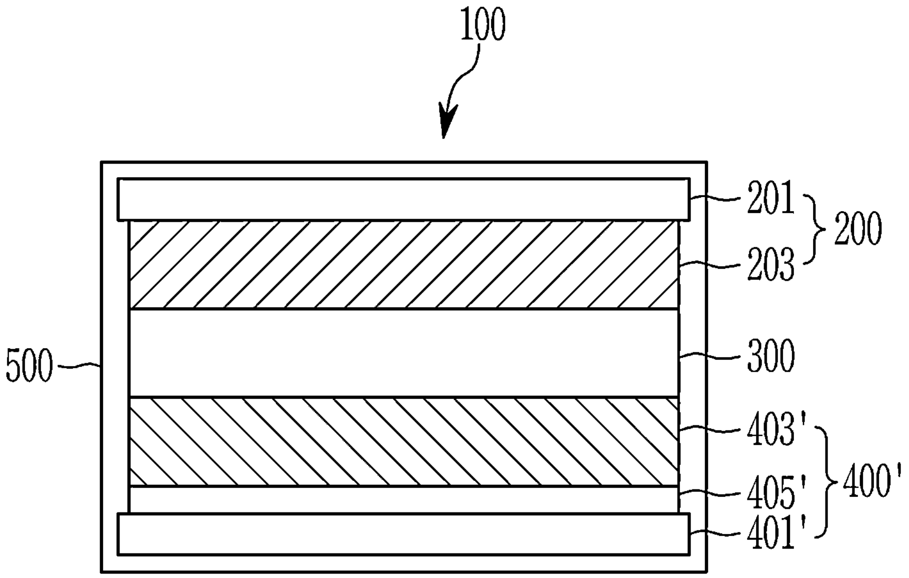
FIG. 2 is a schematic cross-sectional view illustrating state of the all solid-state battery after charging according to one embodiment.

FIG. 1 schematically shows the structure of the all solid-state battery having such structures and FIG. 2 schematically shows the charged state of the all solid-state battery. The all solid-state battery 100 includes a positive electrode 200 including a positive current collector 201 and a positive active material layer 203, a negative electrode 400 including a negative current collector 401 and a negative electrode layer 403, and a solid electrolyte 300 positioned between the positive electrode 200 and the negative electrode 400, and a battery case 500 housing them.

As shown in FIG. 2, when the all solid-state battery 100 is charged, lithium ions are released from a positive active material and deposited on the negative current collector 401', thereby being positioned between the current collector 401' and the negative electrode layer 403".

MODE FOR PERFORMING THE INVENTION

Hereinafter, examples of the present invention and comparative examples are described. These examples, however, are not in any sense to be interpreted as limiting the scope of the invention.

Example 1

(1) Preparation of Positive Electrode 100 parts by weight of anhydrous 2-propanol, 10 parts by weight of lithium methoxide (10% methanol solution) and 0.5 parts by weight of zirconium (IV) tetrapropoxide were mixed to prepare an LZO coating solution. $LiNi_{0.9}Co_{0.05}Mn_{0.05}O_2$ was mixed with the LZO coating solution, agitated for 1 hour, and vacuum-dried at 50° C. to prepare a positive active material.

The LZO-coated positive active material $LiNi_{0.9}Co_{0.05}Mn_{0.05}O_2$, an argyrodite-type solid electrolyte $Li_6PS_5Cl$, a carbon nanofiber conductive material and a polytetrafluoroethylene (PTFE) binder were mixed in an N-methyl pyrrolidone solvent to prepare a positive active material slurry. In the positive active material slurry, the weight ratio of the positive active material, the solid electrolyte, the conductive material and the binder was 85:15:3:1.5.

The positive active material slurry was coated on an aluminum foil and dried followed by pressurizing under a general technique to prepare a positive electrode with a 145 μm thickness having a positive active material layer with a thickness of 100 μm.

(2) Preparation of Solid Electrolyte Layer

To an argyrodite-type solid electrolyte $Li_6PS_5Cl$, an isobutylyl isobutyrate binder solution (solid amount: 50 wt %) added with an acrylate-based polymer, poly(butyl acrylate), was added and mixed therewith. The mixing ratio of the solid electrolyte and the binder was to be 98.7:1.3 by weight ratio.

The mixing was performed by using a Thinky mixer. The obtained mixture was added with 2 mm zirconia balls and was repeatedly mixed with the Thinky mixer to prepare a slurry. The slurry was casted on a release polytetrafluoroethylene film and dried at room temperature to prepare a solid electrolyte layer with a thickness of 5

(3) Preparation of Negative Electrode 40 wt % of styrene butadiene rubber and 1 wt % of sodium carboxymethyl cellulose were added to 59 wt % of a water solvent to prepare a binder solution.

The binder solution, Ag nanoparticles (D50: 60 nm), and carbon black were mixed. The carbon black was a mixture of single particles having a particle diameter of 38 nm and secondary particles and the secondary particles having a particle diameter of 275 nm in which primary particles having a particle diameter of 76 nm were aggregated. Herein, the mixing ratio of Ag nanoparticles and carbon black was a weight ratio of 25:75. In addition, the mixing ratio of the mixture of Ag nanoparticles and carbon black, and the mixture of styrene butadiene rubber and sodium carboxymethyl cellulose was set to be 100:9 by weight ratio.

The mixture was mixed by using a Thinky mixer to control the suitable viscosity. After controlling, 2 mm zirconia balls were added thereto and they were repeatedly mixed with the Thinky mixer to prepare a slurry. The mixed mixture was coated on a stainless steel foil current collector and vacuum-dried at 100° C. to prepare a negative electrode having a negative electrode layer with a 5 μm thickness and a current collector with a 10 μm thickness. In the negative electrode layer, an amount of the binder was 9 wt % based on the total, 100 wt %, of the negative active material and the thickness of the negative electrode layer was 5 μm.

(4) Preparation of all Solid-State Cell

The prepared positive electrode was cut to have a square size of 2.89 $cm^2$, the prepared solid electrolyte was cut to have a square size of 4.41 $cm^2$, and the prepared negative electrode was cut to have a square size of 3.61 $cm^2$, and then they were laminated to fabricate an all solid-state cell.

Example 2

An all solid-state cell was fabricated by the same procedure as in Example 1, except that the negative electrode layer with a thickness of 10 μm and a solid electrolyte layer with a thickness of 15 μm were prepared.

Example 3

An all solid-state cell was fabricated by the same procedure as in Example 1, except that the negative electrode layer with a thickness of 15 μm and a solid electrolyte layer with a thickness of 15 μm were prepared.

Example 4

An all solid-state cell was fabricated by the same procedure as in Example 1, except that the negative electrode layer with a thickness of 15 μm and a solid electrolyte layer with a thickness of 30 μm were prepared.

Example 5

An all solid-state cell was fabricated by the same procedure as in Example 1, except that the negative electrode layer with a thickness of 10 μm and a solid electrolyte layer with a thickness of 30 μm were prepared.

Example 6

An all solid-state cell was fabricated by the same procedure as in Example 1, except that the negative electrode layer with a thickness of 10 μm and a solid electrolyte layer with a thickness of 50 μm were prepared.

Example 7

An all solid-state cell was fabricated by the same procedure as in Example 1, except that the negative electrode layer with a thickness of 15 μm and a solid electrolyte layer with a thickness of 60 μm were prepared.

Example 8

An all solid-state cell was fabricated by the same procedure as in Example 1, except that the negative electrode layer with a thickness of 15 μm and a solid electrolyte layer with a thickness of 90 μm were prepared.

Example 9

An all solid-state cell was fabricated by the same procedure as in Example 1, except that the negative electrode layer with a thickness of 14 μm and a solid electrolyte layer with a thickness of 51 μm were prepared.

Comparative Example 1

An all solid-state cell was fabricated by the same procedure as in Example 1, except that the negative electrode layer with a thickness of 15 μm and a solid electrolyte layer with a thickness of 5 μm were prepared.

Comparative Example 2

An all solid-state cell was fabricated by the same procedure as in Example 1, except that the negative electrode layer with a thickness of 15 μm and a solid electrolyte layer with a thickness of 10 μm were prepared.

Comparative Example 3

An all solid-state cell was fabricated by the same procedure as in Example 1, except that the negative electrode layer with a thickness of 15 μm and a solid electrolyte layer with a thickness of 100 μm were prepared.

Comparative Example 4

An all solid-state cell was fabricated by the same procedure as in Example 1, except that the negative electrode layer with a thickness of 5 μm and a solid electrolyte layer with a thickness of 40 μm were prepared.

Comparative Example 5

An all solid-state cell was fabricated by the same procedure as in Example 1, except that the negative electrode layer with a thickness of 10 μm and a solid electrolyte layer with a thickness of 5 μm were prepared.

Reference Example 1

An all solid-state cell was fabricated by the same procedure as in Example 1, except that the negative electrode layer with a thickness of 40 μm and a solid electrolyte layer with a thickness of 90 μm were prepared.

Reference Example 2

An all solid-state cell was fabricated by the same procedure as in Example 1, except that the negative electrode layer with a thickness of 40 μm and a solid electrolyte layer with a thickness of 50 μm were prepared.

Experimental Example 1) SEM Image

Figure 3:
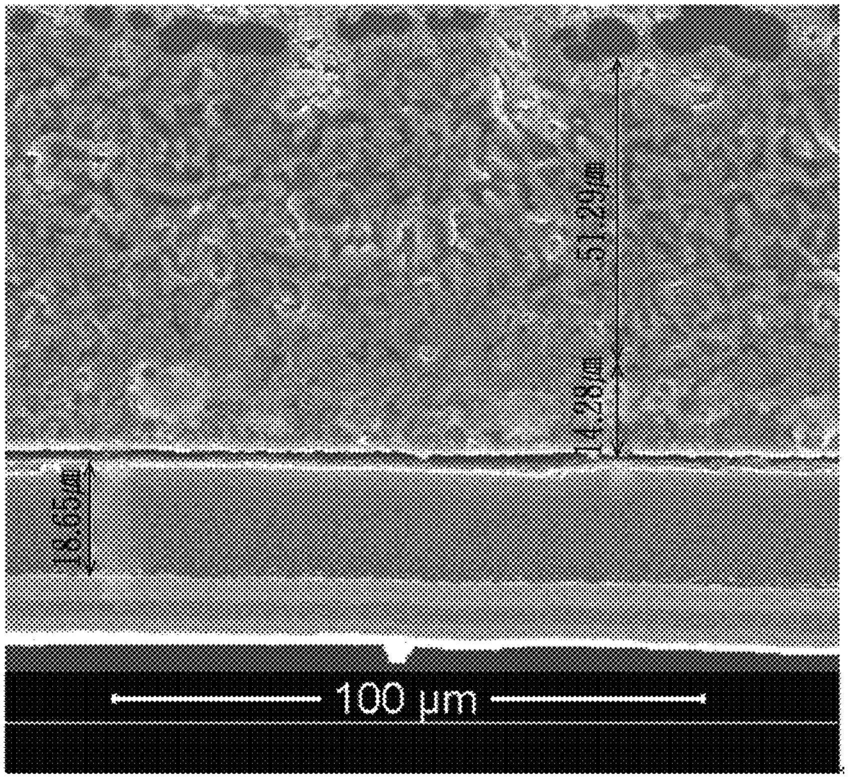
FIG. 3 shows a SEM image of the negative electrode after charging the all solid-state cell of Example 9.

The all solid-state cell of Example 9 was once charged at 0.1 C and discharged 0.1 C at 45° C., and then the negative electrode was collected therefrom to obtain a cross-section SEM image. The result is shown in FIG. 3. As shown in FIG. 3, after charging, while the thickness of the negative electrode was 14.28 μm, i.e., about 14 μm, and the thickness of the solid electrolyte layer was 51.29 μm, i.e., about 51 μm were maintained, the lithium deposition layer was formed at about 18 μm thickness.

Experimental Example 2) Evaluation of Capacity

The all solid-state cells of Examples 1 to 8, Comparative Examples 1 to 5, and Reference Examples 1 and 2 were performed at 45° C. by charging at 0.1 C and discharging at 0.1 C once, charging at 0.1 C and discharging at 0.33 C once, and charging at 0.1 C and discharging at 1 C once, then charging at 0.33 C to measure a 0.33 C discharge capacity. The results are shown in Table 1.

Experimental Example 3) Evaluation of Cycle-Life Characteristic

The all solid-state cells of Examples 1 to 8, Comparative Examples 1 to 5, and Reference Examples 1 and 2 were charged and discharged at 0.33 C and 45° C. for 100 cycles to measure a ratio of the 100$^{th}$ discharge capacity to the 1$^{st}$ discharge capacity. The results are shown in Table 1, as capacity retention.

Experimental Example 4) Evaluation of EOL (End of Life)

While the all solid-state cells of Examples 1 to 8, Comparative Examples 1 to 5, and Reference Examples 1 and 2 were charged and discharged at 0.33 C for 110 cycles, the number of cycles at which the capacity drop by 25% was measured according to the USABC (United States Advanced Battery Consortium) standard, was measured. The results are shown in Table 1.

In Table 1, the negative electrode layer thickness and the electrolyte layer thickness prepared by Examples 1 to 8, Comparative Examples 1 to 5, and Reference Example 1 and 2 are shown and the ratios of the electrolyte layer thickness/the negative electrode layer thickness measured therefrom are shown.

TABLE 1

| | Negative electrode layer thickness (μm) | Electrolyte layer thickness (μm) | Electrolyte layer thickness/negative electrode layer thickness | 0.33 C capacity (mAh/g) | Capacity retention (%) | EOL |
|---|---|---|---|---|---|---|
| Example 1 | 5 | 5 | 1.0 | 168 | 88.9 | >100 |
| Example 2 | 10 | 15 | 1.5 | 171 | 90.4 | >100 |
| Example 3 | 15 | 15 | 1.0 | 170 | 93.2 | >100 |
| Example 4 | 15 | 30 | 2.0 | 172 | 97.5 | >100 |
| Example 5 | 10 | 30 | 3.0 | 170 | 97.7 | >100 |
| Example 6 | 10 | 50 | 5.0 | 171 | 97.7 | >100 |
| Example 7 | 15 | 60 | 4.0 | 168 | 97.9 | >100 |
| Example 8 | 15 | 90 | 6.0 | 162 | 97.5 | >100 |
| Comparative Example 1 | 15 | 5 | 0.3 | 170 | — | 1 |
| Comparative Example 2 | 15 | 10 | 0.7 | 169 | 70.1 | 42 |
| Comparative Example 3 | 15 | 100 | 6.7 | 150 | 97.5 | >100 |
| Comparative Example 4 | 5 | 40 | 8 | 158 | 87.1 | >100 |
| Comparative Example 5 | 10 | 5 | 0.5 | 171 | 73.1 | 38 |
| Reference Example 1 | 40 | 90 | 2.25 | 125 | 93.1 | >100 |
| Reference Example 2 | 40 | 50 | 1.35 | 138 | 94.3 | >100 |

In Table 1, EOL result >100 indicates that the capacity does not decrease by 25% even after charging and discharging at 110 cycles. In addition, in Table 1, Comparative Example 2 exhibited the capacity decreased by 25% or more at 42 cycles, so that the capacity retention was obtained from a ratio of the 42th discharge capacity to the 1$^{st}$ discharge capacity, and Comparative Example 5 exhibited the capacity decreased by 25% or more at 38 cycles, so that the capacity retention was obtained from a ratio of the 38$^{th}$ discharge capacity to the 1$^{st}$ discharge capacity. As shown in Table 1, Examples 1 to 8 in which the ratio of the electrolyte layer thickness to the negative electrode layer thickness (electrolyte layer thickness/negative electrode layer thickness) was 1 to 6, exhibited excellent initial capacity, excellent capacity retention, and excellent EOL characteristics.

Whereas, Comparative Example 1 in which the ratio of the electrolyte layer thickness to the negative electrode layer thickness (electrolyte layer thickness/negative electrode layer thickness) was 0.3, exhibited suitable initial capacity, but extremely deteriorated EOL. The power at 1$^{st}$ charge and discharge was surprisingly dropped to 25% or less, so that the subsequently cycle was not performed, thereby evaluating no capacity retention.

In addition, Comparative Examples 2 and 5 in which the ratio of the electrolyte layer thickness to the negative electrode layer thickness (electrolyte layer thickness/negative electrode layer thickness) were 0.7 and 0.53, exhibited suitable initial capacity, but deteriorated EOL, and also deteriorated capacity retention.

In addition, Comparative Examples 3 and 4 in which the ratio of the electrolyte layer thickness to the negative electrode layer thickness (electrolyte layer thickness/negative electrode layer thickness) were 6.7 and 83, exhibited suitable capacity retention and EOL characteristic, but poor initial capacity which was 150 mAg/g and 158 mAh/g.

Reference Example 1 in which the ratio of the electrolyte layer thickness to the negative electrode layer thickness (electrolyte layer thickness/negative electrode layer thickness) was 2.25, but the negative electrode layer thickness was 40 μm and the solid electrolyte thickness was 90 μm which were thick, and Reference Example 2 in which the ratio of the electrolyte layer thickness to the negative electrode layer thickness (electrolyte layer thickness/negative electrode layer thickness) was 1.35 ad the solid electrolyte thickness was 50 μm, but the negative electrode layer thickness was 50 μm, exhibited suitable capacity retention and EOL characteristic, but surprisingly low initial capacity of 125 mAg/g and 138 mAh/g.

Example 10

A negative electrode including a negative electrode layer with a 10 μm thickness and a current collector with a 10 μm thickness was prepared by the same procedure as in Example 2, except that a mixing ratio of the mixture of Ag nanoparticles and carbon black and the mixture of styrene butadiene rubber and sodium carboxymethyl cellulose was changed to a weight ratio of 100:1. In the negative electrode, an amount of the binder was 1 wt % based on the total, 100 wt %, of the negative electrode layer.

Example 11

A negative electrode including a negative electrode layer with a 10 μm thickness and a current collector with a 10 μm thickness was prepared by the same procedure as in Example 2, except that a mixing ratio of the mixture of Ag nanoparticles and carbon black and the mixture of styrene butadiene rubber and sodium carboxymethyl cellulose was changed to a weight ratio of 100:4. In the negative electrode, an amount of the binder was 4 wt % based on the total, 100 wt %, of the negative electrode layer.

Example 12

A negative electrode including a negative electrode layer with a 10 μm thickness and a current collector with a 10 μm thickness was prepared by the same procedure as in Example 2, except that a mixing ratio of the mixture of Ag nanoparticles and carbon black and the mixture of styrene butadiene rubber and sodium carboxymethyl cellulose was changed into a weight ratio of 100:18. In the negative electrode, an amount of the binder was 18 wt % based on the total, 100 wt % of the negative electrode layer.

Example 13

A negative electrode including a negative electrode layer with a 10 μm thickness and a current collector with a 10 μm thickness was prepared by the same procedure as in Example 2, except that a mixing ratio of the mixture of Ag nanoparticles and carbon black and the mixture of styrene butadiene rubber and sodium carboxymethyl cellulose was changed to a weight ratio of 100:25. In the negative electrode, an amount of the binder was 25 wt % based on the total, 100 wt %, of the negative electrode layer.

Example 14

A negative electrode including a negative electrode layer with a 10 μm thickness and a current collector with a 10 μm thickness was prepared by the same procedure as in Example 2, except that a mixing ratio of the mixture of Ag nanoparticles and carbon black and the mixture of styrene butadiene rubber and sodium carboxymethyl cellulose was changed to a weight ratio of 100:40. In the negative electrode, an amount of the binder was 40 wt % based on the total, 100 wt %, of the negative electrode layer.

Reference Example 3

A negative electrode including a negative electrode layer with a 10 μm thickness and a current collector with a 10 μm thickness was prepared by the same procedure as in Example 2, except that a mixing ratio of the mixture of Ag nanoparticles and carbon black and the mixture of styrene butadiene rubber and sodium carboxymethyl cellulose was changed to a weight ratio of 100:50. In the negative electrode, an amount of the binder was 50 wt % based on the total, 100 wt %, of the negative electrode layer.

Reference Example 4

A negative electrode including a negative electrode layer with a 10 μm thickness and a current collector with a 10 μm thickness was prepared by the same procedure as in Example 2, except that a mixing ratio of the mixture of Ag nanoparticles and carbon black and the mixture of styrene butadiene rubber and sodium carboxymethyl cellulose was changed to a weight ratio of 100:75. In the negative electrode, an amount of the binder was 75 wt % based on the total, 100 wt %, of the negative electrode layer.

Reference Example 5

A negative electrode including a negative electrode layer with a 10 μm thickness and a current collector with a 10 μm thickness was prepared by the same procedure as in Example 2, except that a mixing ratio of the mixture of Ag nanoparticles and carbon black and the mixture of styrene butadiene rubber and sodium carboxymethyl cellulose was changed to a weight ratio of 0:100. In the negative electrode, an amount of the binder was 100 wt % based on the total, 100 wt %, of the negative electrode layer.

Experimental Example 4) Evaluation of Electrical Resistance

The electrical resistance of the negative electrode according to Examples 1, and 10 to 14, and References Examples 3 to 5 were measured by using a sheet resistance measurement instrument with a 4 probe system, and the results are shown in Table 2.

TABLE 2

| | In negative electrode layer, an amount of the binder based on 100 wt % of negative active material (wt %) | Electrical resistance (Ω) |
|---|---|---|
| Example 10 | 1 | 0.001 |
| Example 11 | 4 | 0.003 |
| Example 1 | 9 | 0.005 |
| Example 12 | 18 | 0.014 |
| Example 13 | 25 | 0.095 |
| Example 14 | 40 | 0.98 |
| Reference Example 3 | 50 | 1.226 |
| Reference Example 4 | 75 | 38.051 |
| Reference Example 5 | 100 | 1524.212 |

As shown in Table 2, the all solid-state cells of Examples 1, and 10 to 14 in which the amount of the binder in the negative electrode layer was 1 wt % to 40 wt % based on the total, 100 wt % of the negative active material, exhibited very low electrical resistance, but Reference Examples 3 to 5 in which the amount of the binder was more than 40 wt % based on the total, 100 wt % of the negative active material, exhibited surprisingly increased electrical resistance.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

The invention claimed is:

1. An all solid-state battery, comprising:

a negative electrode comprising a current collector and a negative electrode layer disposed on one surface of the current collector;

a positive electrode; and a solid electrolyte located between the negative electrode and the positive electrode, wherein the negative electrode layer has a thickness of 5 μm to 15 μm, wherein the solid electrolyte layer has a thickness of 5 μm to 90 μm, wherein the negative electrode layer includes a negative active material and the negative active material includes a carbon-based material and metal particles, wherein the solid electrolyte is a sulfide-based solid electrolyte, and wherein the negative electrode layer thickness (a) and the solid electrolyte layer thickness (b) have the relationship expressed in Equation 1:

$$2.0 \leq b/a \leq 5.0 \quad \text{(Equation 1)}$$

2. The all solid-state battery of claim 1, wherein the negative active material includes a binder in an amount of 1 wt % to 40 wt % of the negative active material.

3. The all solid-state battery of claim 2, wherein the binder includes a butadiene-based rubber and a cellulose-based compound.

4. The all solid-state battery of claim 1, wherein the negative active material includes amorphous carbon.

5. The all solid-state battery of claim 1, wherein the metal particle is selected from Ag, Zn, Al, Sn, Mg, Ge, Cu, In, Ni, Bi, Au, Si, Pt, Pd, or a combination thereof.

6. The all solid-state battery of claim 1, wherein the metal particle has a size of 5 nm to 800 nm.

7. The all solid-state battery of claim 1, wherein the solid electrolyte is $Li_aM_bP_cS_dA_e$ (where a, b, c, d, and e are all 0 or more and 12 or less, M is Ge, Sn, Si, or a combination thereof, and A is one of F, Cl, Br, or I).

8. The all solid-state battery of claim 1, wherein the negative electrode further includes a lithium deposition layer between the current collector and the negative electrode layer, after charging.

9. The all solid-state battery of claim 8, wherein the lithium deposition layer has a thickness of 10 μm to 50 μm.

10. The all solid-state battery of claim 1, wherein the negative electrode layer has the thickness of 10 μm to less than 15 μm.

11. The all solid-state battery of claim 10, wherein the solid electrolyte layer has a thickness of 5 μm to 30 μm.

* * * * *